United States Patent [19]

Caridis et al.

[11] Patent Number: 5,277,533
[45] Date of Patent: Jan. 11, 1994

[54] APPARATUS FOR HANDLING ELONGATE PRODUCTS

[75] Inventors: Anthony A. Caridis, Belmont; John Cranfield, San Bruno; Kyle C. Vine, Burlingame, all of Calif.

[73] Assignee: Heat and Control, Inc., South San Francisco, Calif.

[21] Appl. No.: 823,829

[22] Filed: Jan. 22, 1992

[51] Int. Cl.⁵ .................. B65G 69/00; B65G 47/04; G01G 19/32
[52] U.S. Cl. ........................... 414/21; 177/25.18; 198/533; 198/959
[58] Field of Search ............ 414/21; 177/25.18; 198/533, 771, 959; 53/502, 202

[56] References Cited

U.S. PATENT DOCUMENTS

| | | | |
|---|---|---|---|
| 2,976,006 | 3/1961 | Stambera | 198/959 |
| 3,782,528 | 1/1974 | Burger et al. | 414/21 |
| 4,511,009 | 4/1985 | Kataoka | 177/25.18 |
| 4,561,510 | 12/1985 | Sugioka et al. | 198/959 |
| 4,564,103 | 1/1986 | Sashiki et al. | 177/25.18 |
| 4,678,047 | 7/1987 | Kataoka et al. | 177/25.18 |
| 4,819,749 | 4/1989 | Guardiola | 177/25.18 |

Primary Examiner—Michael S. Huppert
Assistant Examiner—R. B. Johnson
Attorney, Agent, or Firm—Flehr, Hohbach, Test, Albritton & Herbert

[57] ABSTRACT

Weighed, rod-like product is deposited into a receptacle having a bottom wall formed by an iris plate assembly, which may be vibrated and which opens on command to drop the product into one of two cylindrical holding canisters with clamshell doors on their sides. The canisters are mounted in an "L" configuration which toggles back and forth through a 90 degree rotation presenting each canister first in a vertical position to receive product from the receptacle and then in a horizontal position to release product via the clamshell doors into a pocket such as a timing hopper, or a paperboard tray carried by a conveyor to a packaging machine. Interlocks are provided to preclude release of the product or movement of the conveyor when synchronization is lost with respect to either the weighing or packaging machine.

6 Claims, 11 Drawing Sheets

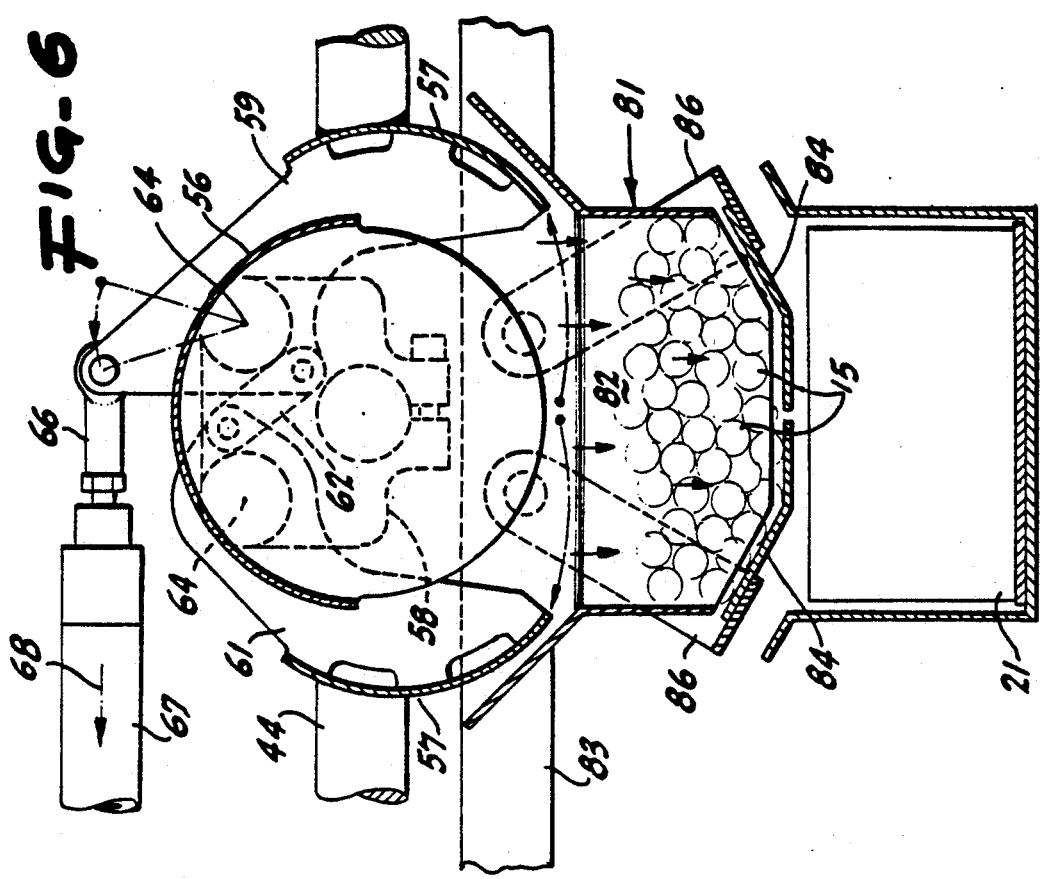

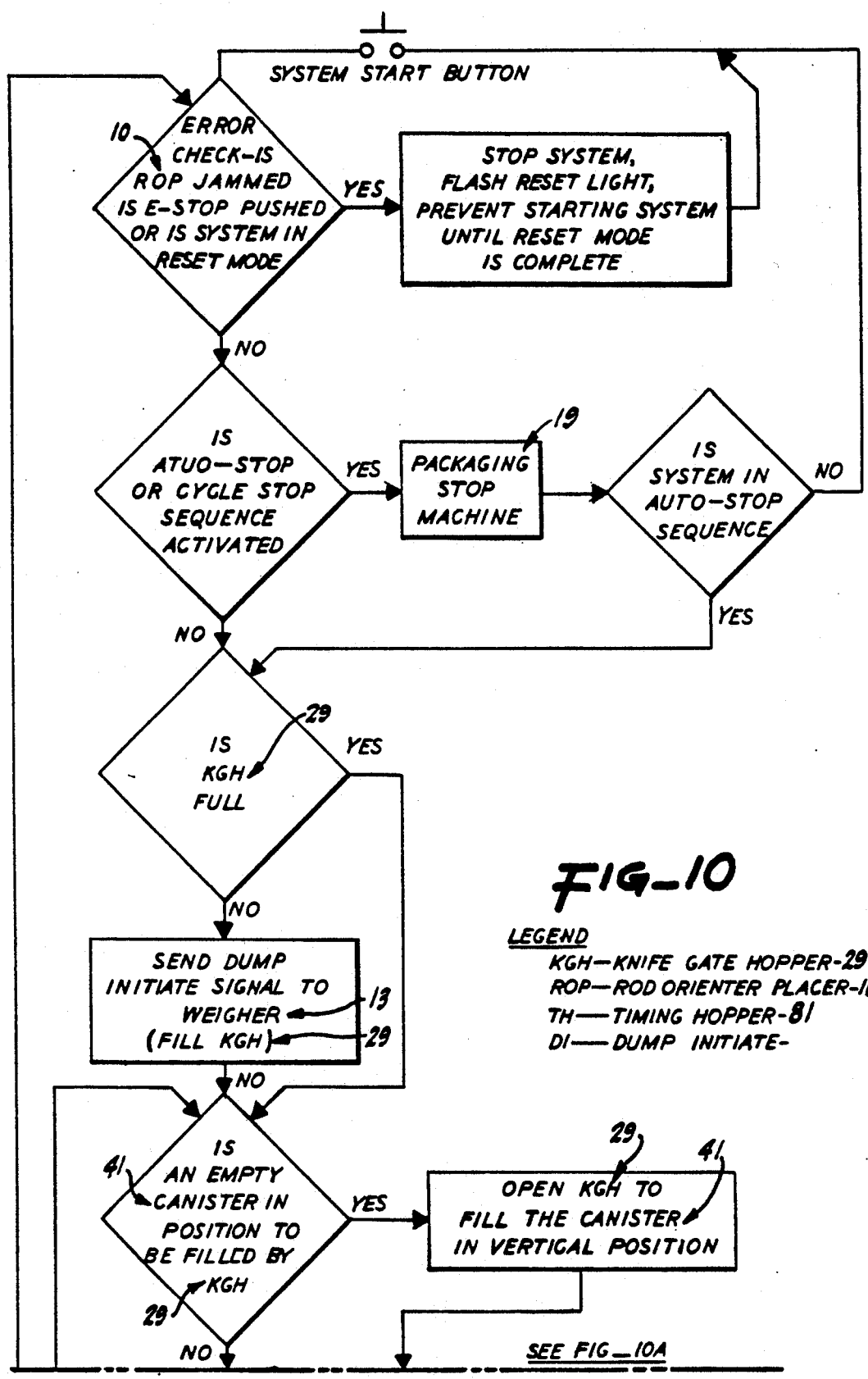

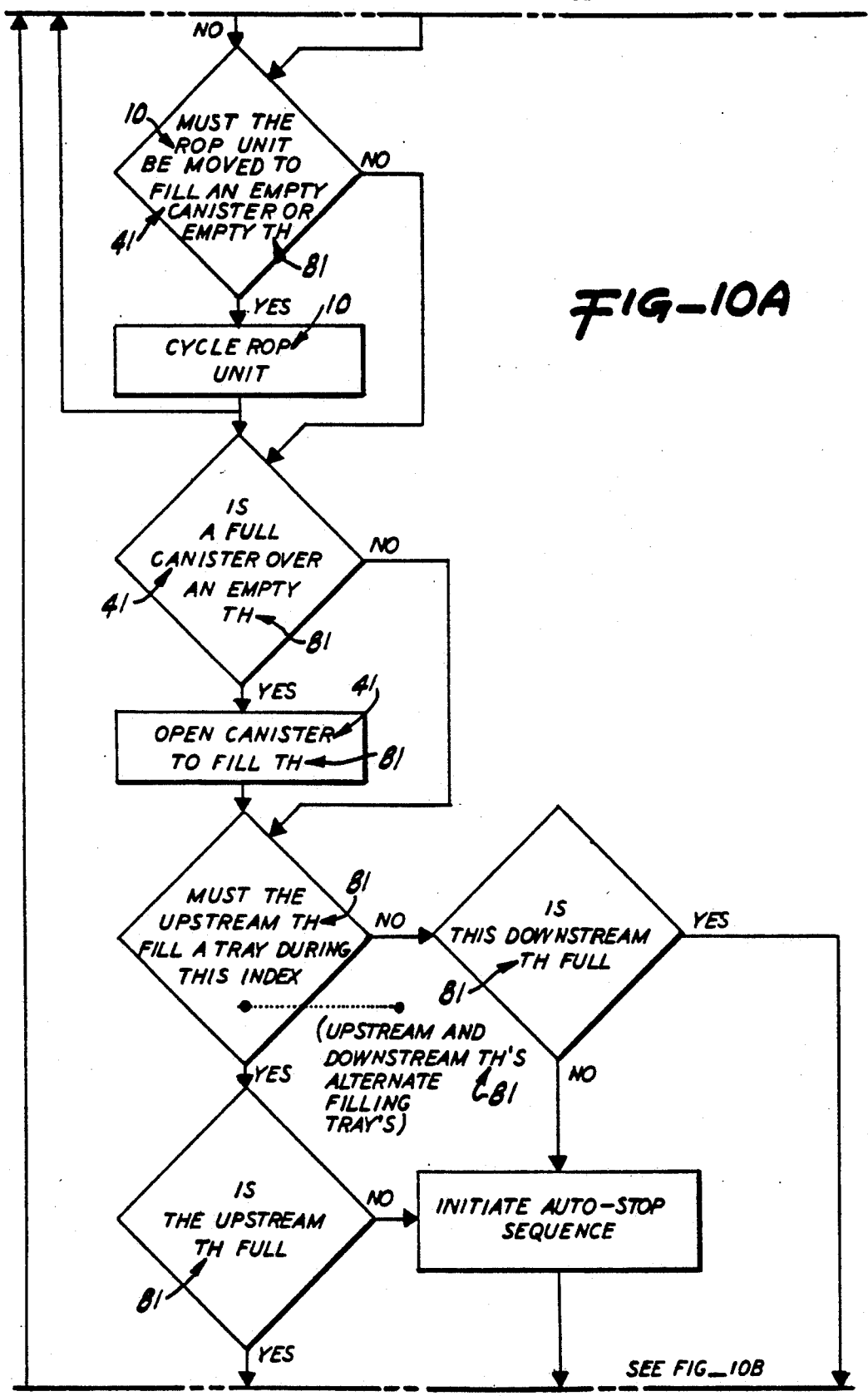

APPARATUS FOR HANDLING ELONGATE PRODUCTS

TECHNICAL FIELD

The present invention relates to packaging methods and apparatus and more particularly concerns methods and apparatus for handling aligned rod-like products such as pretzel sticks, bread sticks, licorice sticks and the like, and presenting such articles in an organized weighed batch for packaging.

BACKGROUND OF THE INVENTION

It has become well-established in the packaging field to weigh bulk articles in a combinational computerized weigher before packaging, thus to obtain a high degree of accuracy when packaging bulk materials. When the products weighed for packaging comprise rod-like elements such as licorice, a group of pencils, pretzel sticks, bread sticks, and the like, there is a particular problem of how best to handle such elongate products for packaging with a minimum of breakage. The ideal condition is to package these articles as an aligned group so as to consume a minimum amount of packaging material and to make a most compact package for placing subsequently in the larger shipping container or box. In the field it is generally understood that conventional packaging techniques which result in random placement of elongate articles also may require larger volume of packages than if the same number of articles were placed in alignment and then packaged.

To facilitate rapid weighing and packaging of elongate articles, machines have been developed which align the articles prior to packaging. U.S. Pat. No. 4,965,984 discloses a method and apparatus for handling elongate elements on an inclined flight-equipped conveyer which discharges into a collector for storage and transfer to a packaging machine. The articles free-fall from the conveyor to the collector.

U.S. Pat. No. 4,586,313 concerns the packaging of elongated pieces characterized by horizontal, planer series of pans in which French fries and the like are moved from pan to pan and aligned with the longitudinal axes parallel to one other by the action of a plurality of vibrators. When the individual pieces are aligned, they fall into a weighing bucket which has an electronically controlled retention flap that will provide the aligned French fries into a bagging machine when a full charge is received.

U.S. Pat. No. 4,514,959 discloses a system for aligning and packaging elongated products in two steps. First, the randomly oriented product, such as French fries, are horizontally disposed on a vibrating conveyor. At a distal end of the conveyor, a number of channels are provided which receive the advancing French fries. The channels are configured so that the articles must advance with their elongate dimensions parallel to the channel length and the channels are positioned at a preselected angle with respect to a discharge chute. When the French fry is presented to the end of the channel towards the discharge chute, it is turned further to be parallel with the length of the discharge chute. The French fry then drops through the chute into a weighing device and thence to the packaging machine.

We believe it desirable to minimize the distance and time a product is in free-fall in order to materially reduce the amount of product fracture and crumbling and to gain efficiency in handling elongate products.

We believe it would be advantageous to provide an apparatus and method for receiving weighed charges of elongated articles and for presenting those articles in as gentle a condition as feasible to the packaging machine and the present invention is focused at that result.

SUMMARY OF THE INVENTION

The general object of the present invention is to provide an improvement in an apparatus for receiving rod-like products from a weigher and for placing such products in an aligned selected group for packaging.

Another object of the invention is to provide apparatus for handling a weighed batch of elongated products in a gentle substantially nondestructive manner.

Another object of the invention is to provide an improved system for handling elongated weighed products and for distributing such products to more than one packaging machine.

According to the present invention, the apparatus for receiving rod-like elements, such as pretzels, breadsticks, beef jerky, licorice and the like, includes a receptacle having an opening at the top for receiving weighed batch products and for maintaining the products in a generally vertical orientation. A gate is provided for releasing the products from the receptacle for receipt by a canister arranged therebelow for pivotal movements between a vertical and a horizontal position. A side wall of the canister may be selectively retracted in the horizontal condition for depositing elements into a pocket for transfer to a packaging machine or directly into a packaging machine. Control means are provided to synchronize the actuation of the device with either the weighing or the packaging machines.

BRIEF DESCRIPTION OF THE DRAWINGS

FIGS. 6 and 7 are sectional views taken in the direction of the arrows 6—6 and 7—7 in FIG. 3;

FIGS. 10, 10a and 10b are simplified diagrams of a program of operation for the present invention.

DESCRIPTION OF THE PREFERRED EMBODIMENTS

Figure 1:
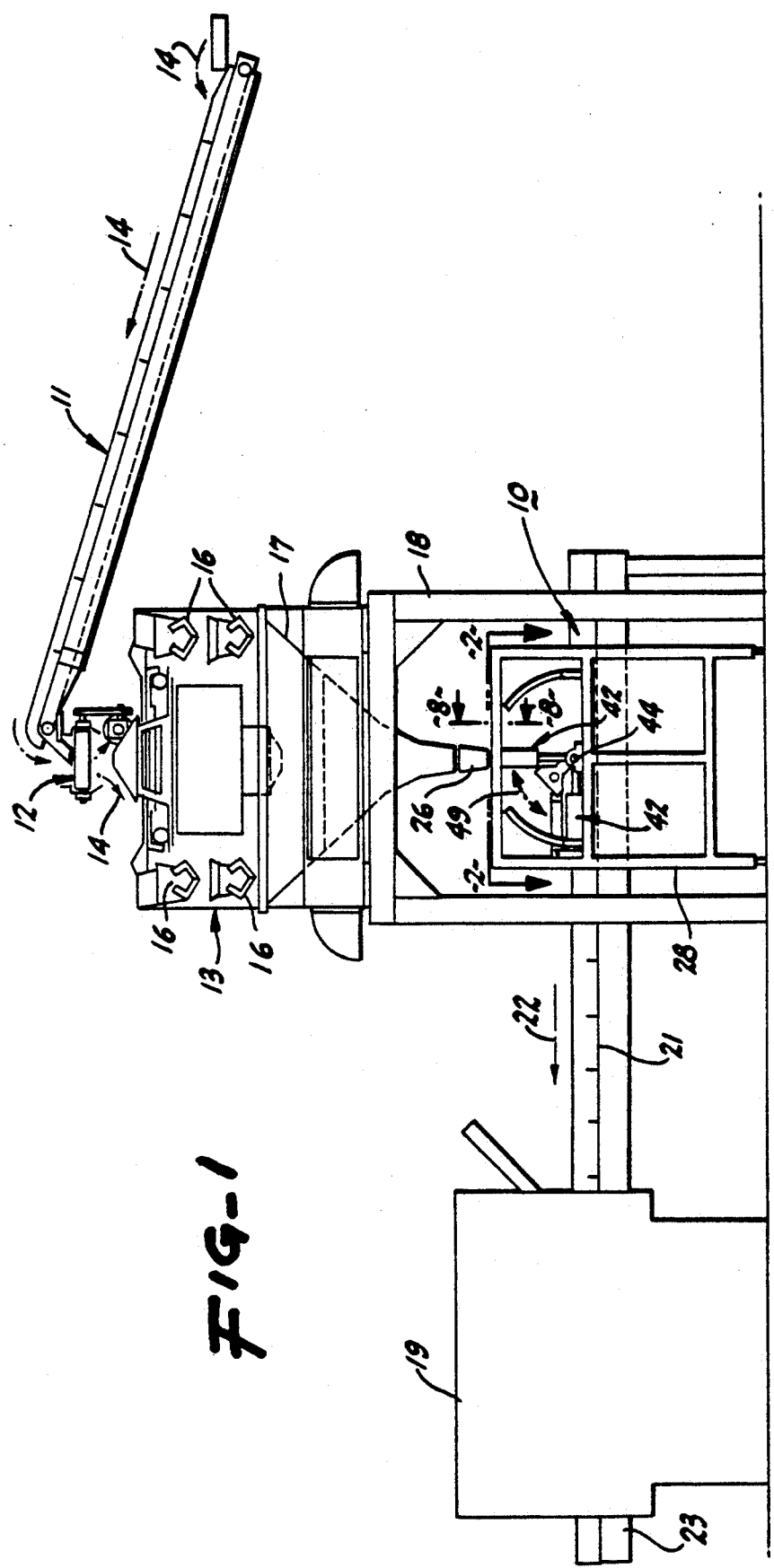
FIG. 1 is a side elevational view of a weighing and packaging system containing a preferred embodiment of the present invention.

There is shown in FIG. 1 of the drawings a rod aligning and transfer unit 10 made in accordance with the principles of the present invention included in a system for transferring, weighing and packaging elongate rod-like elements such as pretzels, breadsticks, beef jerky, licorice, French fried potatoes or the like. The system includes an inclined flight-equipped belt conveyor 11 which deposits bulk products 15 from the upper discharge end onto a generally horizontally arranged belt conveyor 12 which in turn deposits the product onto a combinational computerized weigher 13, the product 15 flowing in the direction of the arrows 14. The products are weighed in one or more of the buckets 16 on the combinational weigher to meet exactly or to exceed slightly a target weight, say two ounces, and are then discharged from the weigher to flow downwardly in an incline chute 17 which is equipped with guides (not shown) to assure that the rod-like product moves generally ends down when the product is received in the rod-aligning and transfer apparatus 10. The combinational weigher 13 is mounted on a frame 18 above the aligning and transfer apparatus 10.

The system further includes a packaging machine 19. which may be of conventional configuration and construction, and which is adapted to receive via a flight-equipped horizontally disposed conveyor 21 the precisely aligned and weighed batches of product from the transfer and aligning apparatus 10, the conveyor 21 moving in the direction of the arrow 22 at the delivery stage. The pre-weighed, aligned and packaged products exit the packaging machine 19 at the discharge station 23 at which point a number of packages may be concentrated into a larger container for shipment out of the plant. If preferred, the packaging machine 19 may be a vertical form fill as seal unit or a horizontal packaging machine.

Figure 4:
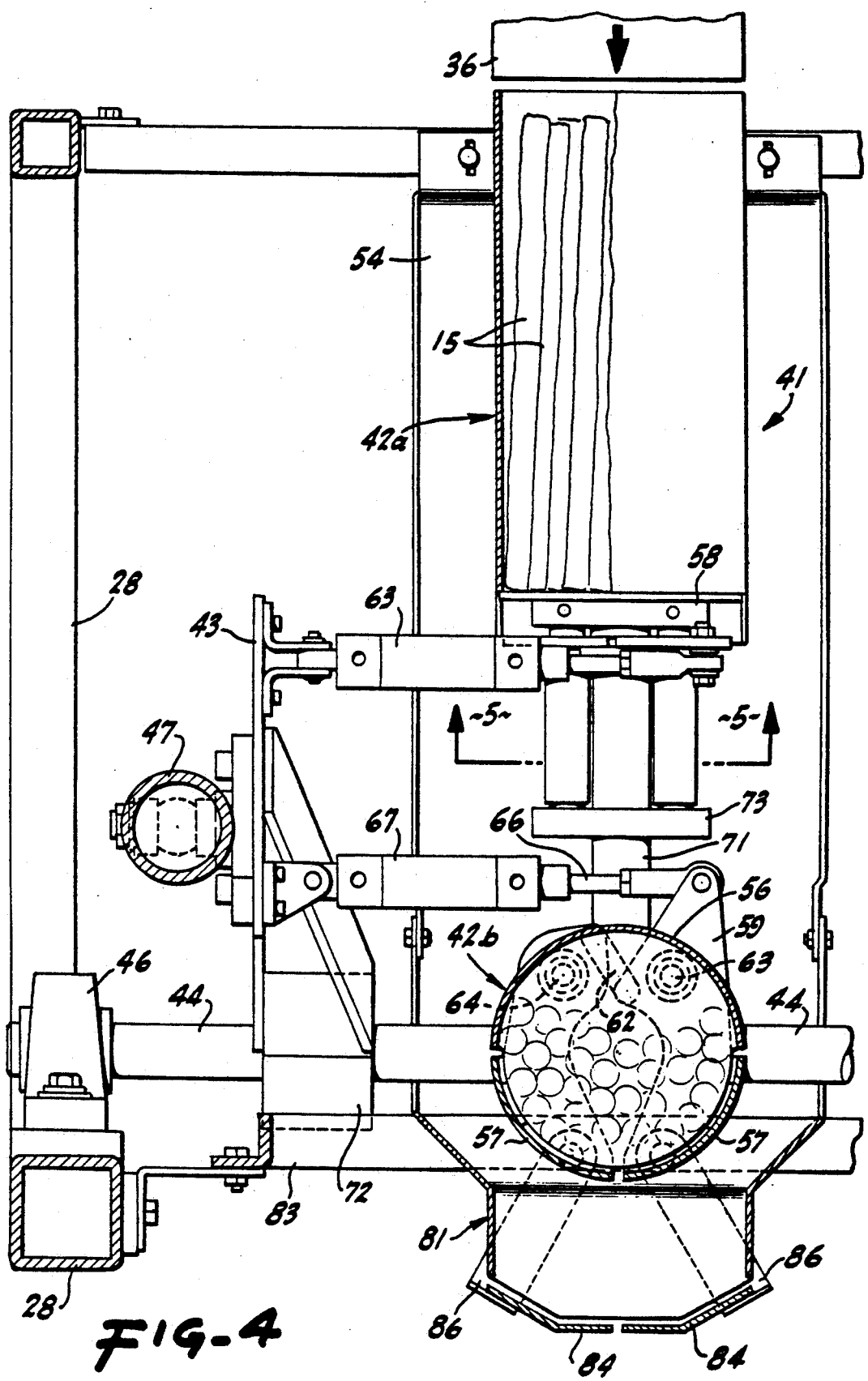
FIG. 4 is an enlarged sectional view taken in the direction of the arrows 4—4 of FIG. 3.

Products 15 which are typically handled by the apparatus 10 are shown by way of example in FIGS. 4, 6 and 7 where salt-encrusted pretzel sticks are illustrated. It will be understood that many other elongate or rod-like products may be successfully aligned and transferred for packaging by the apparatus 10.

Figure 8:
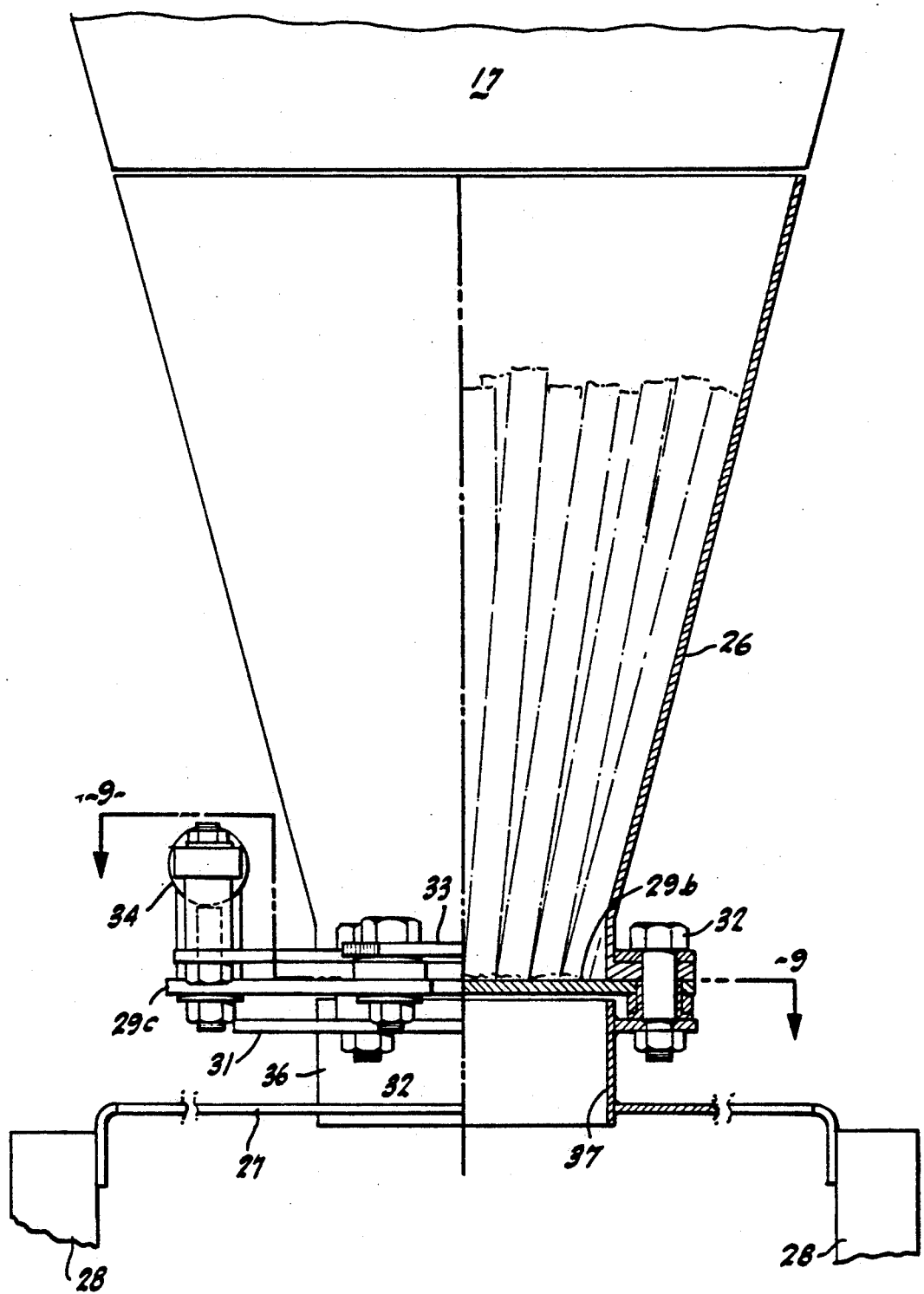
FIG. 8 is a greatly enlarged view taken in the direction of arrows 8—8 in FIG. 1.
Figure 9:
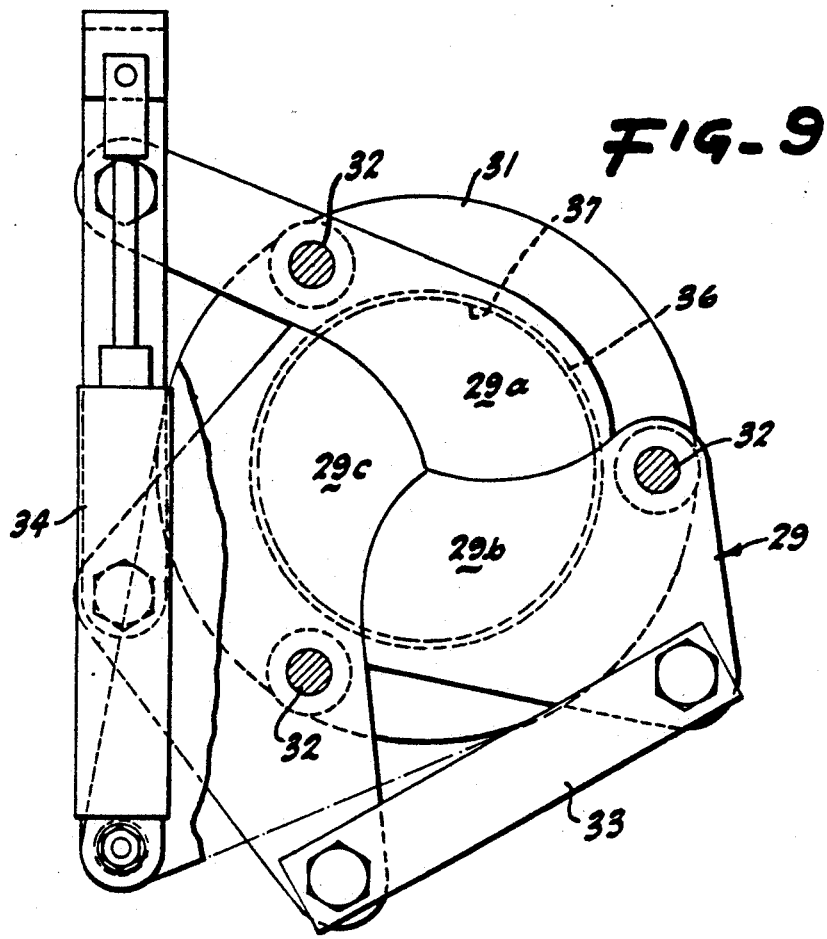
FIGS. 9 and 9a are views taken in the direction of the arrows 9—9 in FIG. 8 showing a gate mechanism in the closed and open positions, respectively.
Figure 9A:
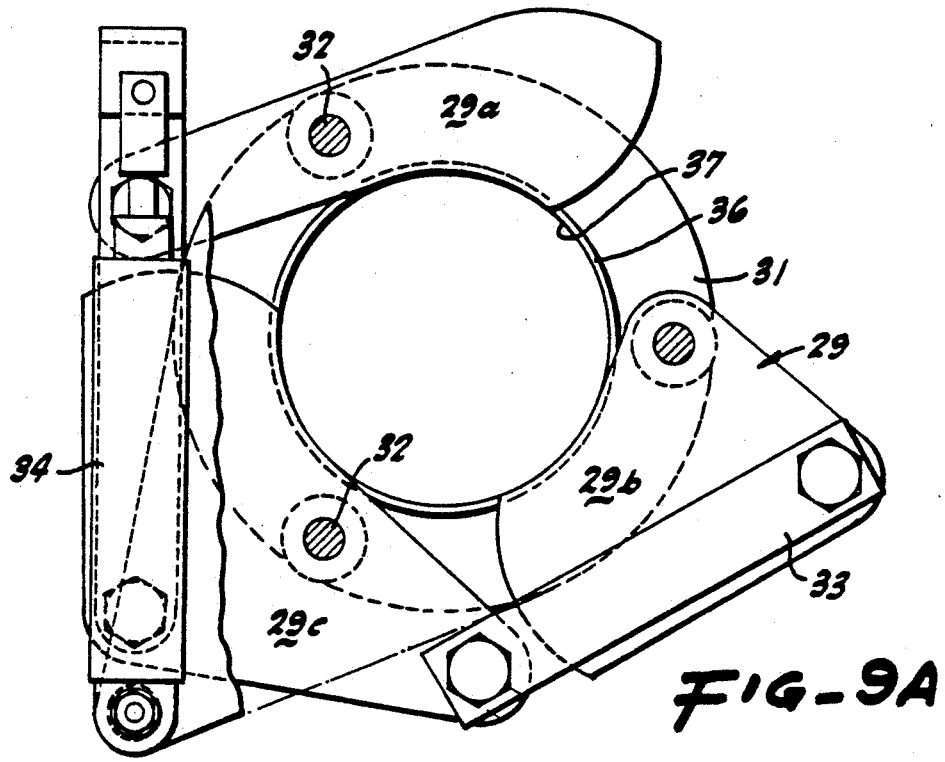

We mentioned above that the products were weighed in a computerized combinational weigher 13 in groups or batches which descend from the hopper 16 to the inclined chute 17 which contains a number of baffles which tends to direct the products in endwise motion into a frusto-conically shaped, cuplike receptacle 26 arranged just below the lower end of the chute 17. Referring more specifically to FIGS. 8, 9 and 9a, it will be seen that the receptacle 26 is generally cylindrical in cross-section and is equipped with a generally horizontal support plate 27 which is fixedly secured to a frame 28 of the rod transfer apparatus 10. Vibrator means 30 are coupled to the receptacle 26 through the support plate 27 to cause products to disengage from one another and to be aligned and free to move.

A pneumatic piston-actuated, three-leaf iris or knife-gate 29 serves as a moveable floor or bottom of the receptacle. The leaves 29a, b and c of the knife-gate are pivotally mounted to a horizontal flange 31 at the horizontal pivot 32 and a link 33 couples the leaf 29b with leaf 29c and leaf 29a. The leaves 29 are driven to pivot by the power cylinder 34 operated as shown in FIGS. 9 and 9a in the closed and open position, respectively. The cylinder 34 may be of either pneumatic or hydraulic-actuated design and when its cylinder rod is in the contracted condition as shown in FIG. 9a, the iris 29 is fully opened, revealing a cylindrical passage way through a collar 36 through which the product descends by gravity through the opening 37 into one of the canisters 41 arrayed therebelow.

Figure 3:
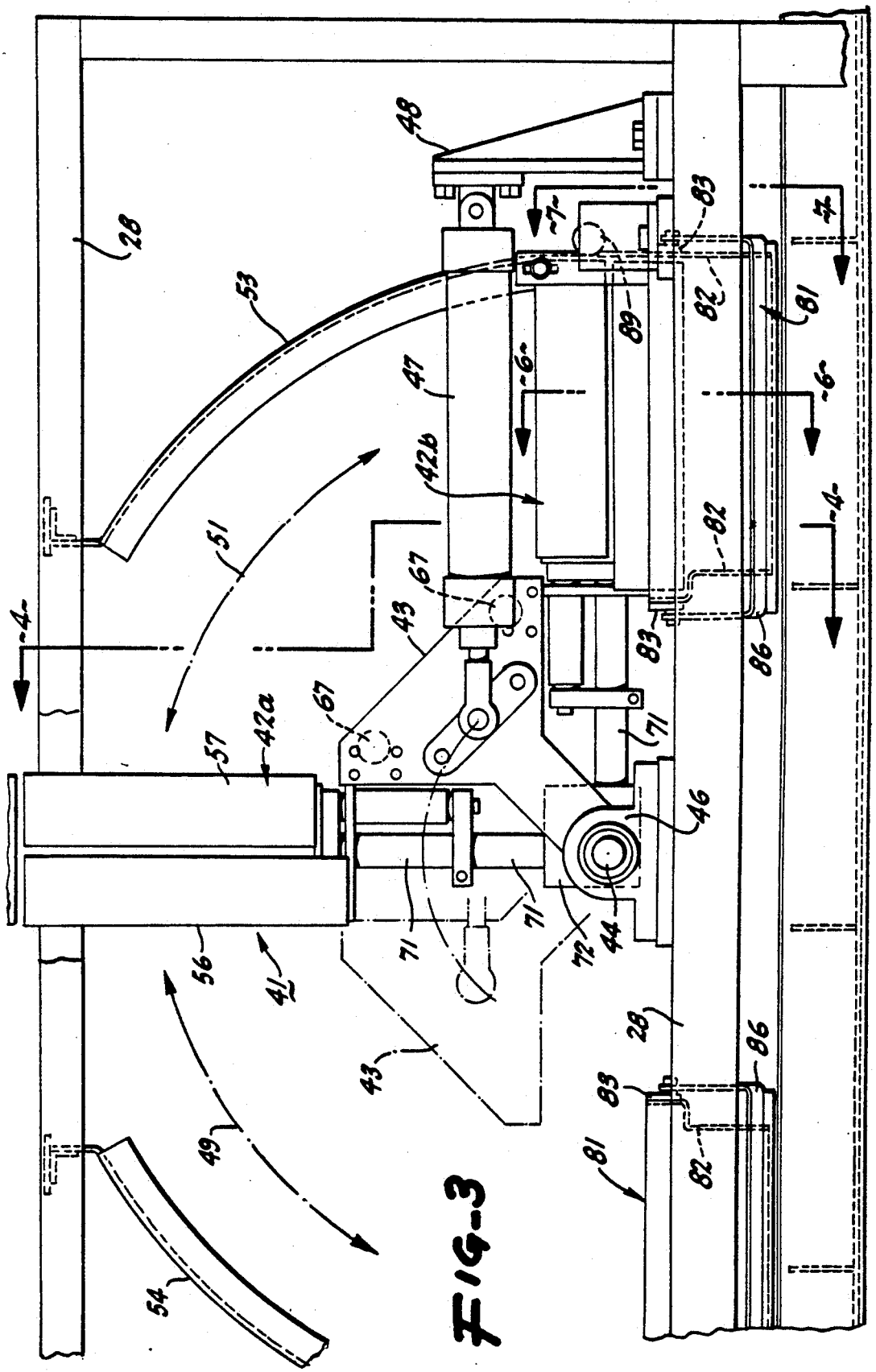
FIG. 3 is a partial side elevation showing of the preferred embodiment of the present invention.
Figure 5:
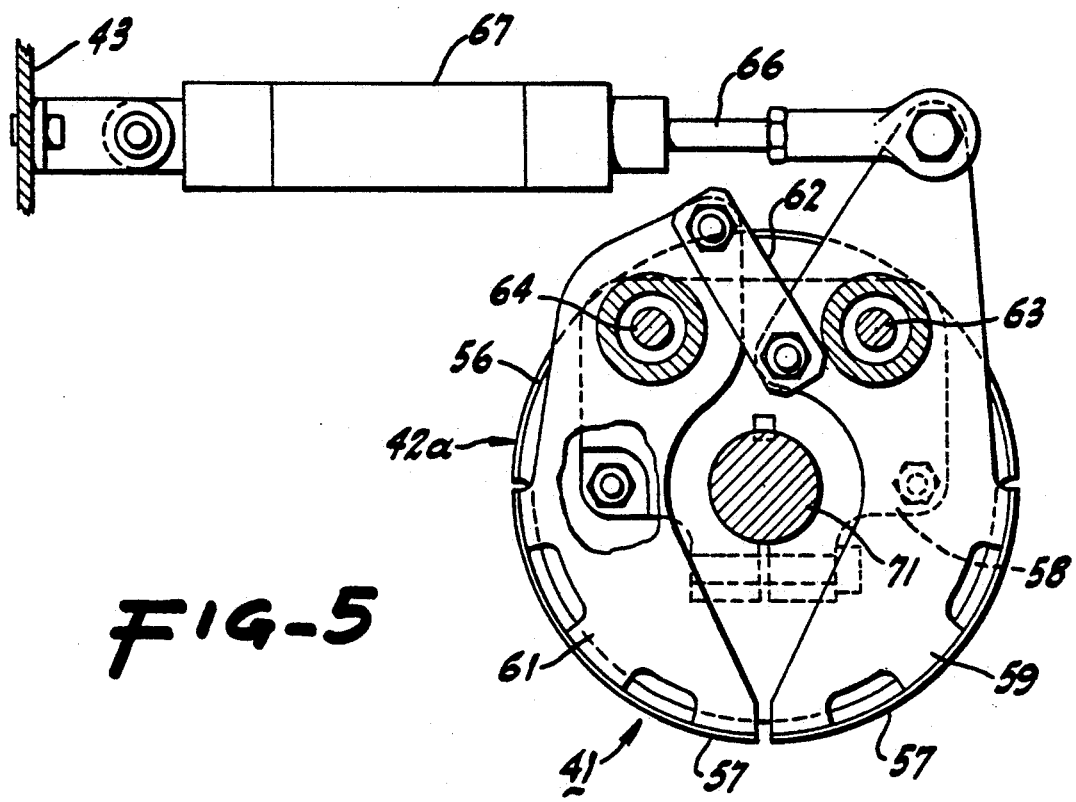
FIG. 5 is a sectional view taken in the direction of the arrows 5—5 of FIG. 4.

Referring to FIGS. 3, 4 and 5, the canister array 41 preferably comprises at least two substantially identical assemblies 42a and b mounted at a right angle to one another upon a subframe 43 which is coupled to a horizontally-extending shaft 44 the ends of which are received in the bearings 46 fixedly secure to the frame 28. The subframe 43 carrying the canister array is caused to pivot on the horizontal shaft 44, being driven by power cylinder 47 the fixed end of which is pivotally coupled to a bracket 48 mounted on the frame 28 (FIG. 3). The power cylinder 47 serves to drive the subframe 43 through an angle of substantially 90° from a first position where the subframe 43 is illustrated in solid lines in FIG. 3 to a second position where the subframe is indicated in broken lines. Here it will be understood that the canister assembly 42a shown in the upright or vertical position in FIG. 3 will be pivoted along with the subframe into a horizontal position as indicated by the arrow 49 while the canister assembly 42b will pivot from the horizontal position as shown in FIG. 3 into an upright position, moving in the pathway indicated by the arrow 51 such that the assembly 42a will occupy a substantially vertical position to be in alignment with the receptacle collector 26 arranged thereabove. Thus, the canister assembly is adapted to shift from a position indicated in FIG. 1 to that indicated in FIG. 3 in accordance with the timed actuation of the power cylinder 47.

It will be appreciated that the canister assemblies 42 are open at one end so that product may be received therein, this being the distal end, and stationery guards 53 and 54 are arranged on the frame 28 radially outwardly of the distal end of the canister assemblies so as to deter outward movement of the product contained in the canisters as the array is shifted from a vertical product-containing position into the horizontal position where product is discharged from the canister assemblies. It will be seen that the guards 53 and 54 are arcuate in profile so as to accommodate free movement of the canisters.

Referring to FIGS. 3, 4 and 5, each canister assembly 42 includes a fixed half shell portion 56 and two complementary doors 57 which when in the closed position define with the fixed half 56 a generally cylindrical body as indicated in the drawings for the receipt of the elongated product 15. The doors 57 are pivotally mounted at their proximal or inward ends to a canister base 58. First 59 and second 61 arms are coupled by a link 62 to rotate about the pivot points 63 and 64 (FIG. 5) in response to power applied to the arm 59 by the rod 62 coupled thereto and extending into the cylinder 63. As indicated in FIG. 6, as the rod 62 is retracted with respect to the cylinder 63 in the direction of the arrow 66, the arms 59 and 61 pivot about their respective pivot points 63 and 64 moving the door 57 into an open condition as indicated in FIG. 6. The extension of the rod 62 from the cylinder 63 causes the doors 57 to return to a closed position as indicated in FIG. 5.

As shown in FIG. 4, the power cylinder 67 which drives the canister doors 57 is mounted to the subframe 43 and moves with the subframe. The canister 43 is further supported on the frame and coupled thereto by support rods 72 (FIG. 3) which extend outwardly from a mounting block 72 which itself is rotatably mounted on the horizontal shaft 44. The canister door pivots 63 and 64 are connected to a support bar 73 fixedly secured to the support rod 71 thereby supplying the rigidity for the opening and closing of the canister doors under the drive force of the cylinder 67.

It will be understood from the above text that elongated articles are weighed in the computerized weigher 13, released to proceed by gravity down the incline chute 17 where they are guided into an endwise flowpath to be received in the collector receptacle 26 and held there supported on the iris knife-gate 29 until released into the vertically disposed canister 41 which may then be shifted as indicated by the arrow 51 into a horizontal position wherein the moveable canister doors 57 are actuated for depositing the product 15 or permitting the product 57 to drop into a receiving pocket the nature of which is dictated by the system design. It could be either a pocket on a horizontal product conveyor leading to a packaging machine or a pocket as defined by a timing hopper 81 arrangement as illustrated in FIGS. 3, 4 and 7. The timing hoppers 81 or pockets are equal in number to the number of canisters 42 so that a canister will serve to deposit products into the associated pocket or timing hopper 81.

Figure 2:
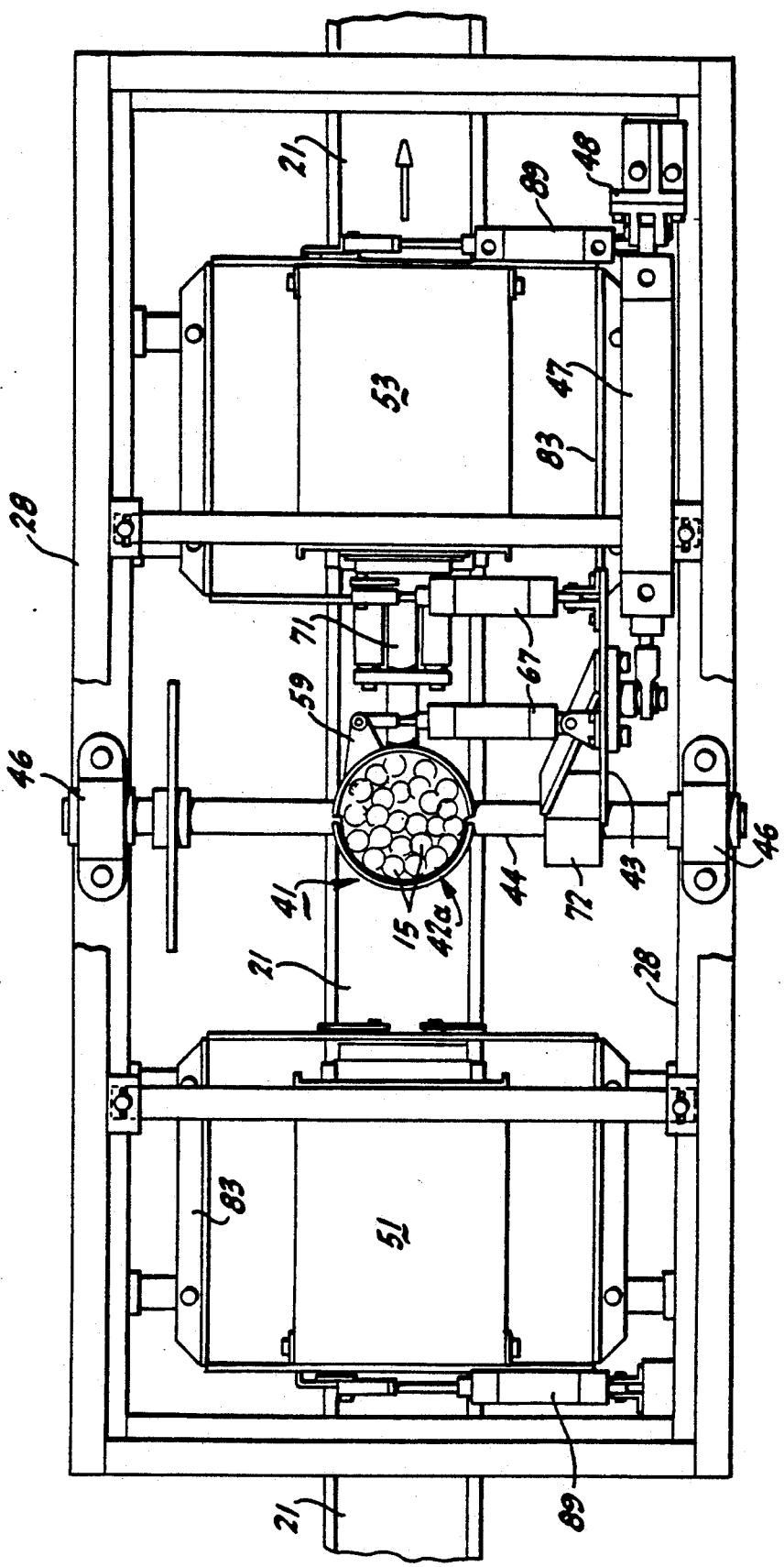
FIG. 2 is a greatly enlarged sectional view taken in the direction of the arrows 2—2 of FIG. 1.

The timing hoppers 81 are best shown in FIGS. 3, 6 and 7. Each of the two spaced apart timing hoppers 81 includes an upstanding plate frame 82 which connects with the curved canister guard 53 and at the lower end the member 82 provides one of the endwalls for the pocket or hopper 81. A horizontally disposed perimeter frame 83 is connected to the frameplate 82, a pair of complementary hopper doors 84 being pivotally mounted to the frame 83, as shown in FIGS. 6 and 7. More specifically, generally C-shaped mounting brackets 86 extend along the formed sheetmetal hopper doors. The end of the brackets 86 are each pivotally mounted to the horizontal frame 83 and a link 87 pivotally couples together the brackets 86 in a manner such that the doors 84 pivotally move together for opening and closing as a moving pair in response to forces applied at the crank end by the timing hopper drive cylinder 89. The base of the cylinder 87 is mounted upon the frame 28 as shown in FIG. 2. Retraction of the cylinder drive rod in the direction of the arrow 91 (FIG. 7) serves to pivot the doors into an open position as indicated in FIG. 7 thus permitting any product 15 disposed therein to drop into the pocket or space between the flights of the conveyor 21.

OPERATION OF THE PREFERRED EMBODIMENT

Figure 10B:
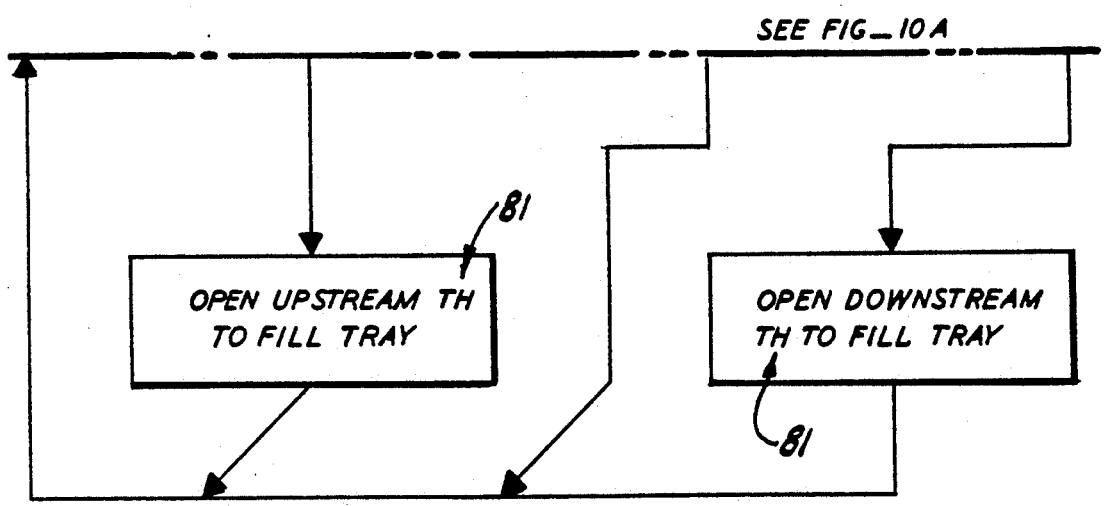

The operation flow chart is shown in FIGS. 10 and 10a and should be referred to at this point. Considering now the mode of operation taken in the direction of product flow as indicated by the arrow 14 in FIG. 1, it will be seen that product 15 is delivered to the combination weigher 13 from the transfer conveyor 11. The product as received by the weigher is in random array with the stick-like elements extending randomly. A vibratory dispersion table and guides placed around the weigher encourage the rod-like element to take an endwise orientation and move more parallel to one another.

The product, after weighing, is discharged and falls into the chute 17 and proceeds to the collector or receptacle 26 as is supported therein on the iris or knifegate 29 which is vibrated and keeps the product unentangled and movable. In the collector 26 the product is vibrated to be generally in the vertical coparallel orientation. A canister array is rotated on the shaft 44 so that one of the canisters 42 overlies a pocket or a timing hopper 81 while the other canister 42 is positioned below the knifegate for receipt of the products upon opening of the gate 29.

Meanwhile, in the time sequence the horizontally disposed canister 42 is caused to discharge product into the pocket or timing hopper 81. In one embodiment, when a pocket of the flight-equipped conveyor passes just beneath a first-timing hopper 82, the hopper doors 84 are caused to pivot open and product is permitted to fall into the pocket of the conveyor 21. Next, the second canister unit that was charged upon opening of the knifegate, is rotated so that the vertical and horizontal canisters exchange position and the second canister 42 is permitted to discharge into the pocket or second timing hopper arranged therebelow. The timing hopper, in turn, discharges into a pocket disposed below on the product conveyor 21.

The product conveyor 21 carries the product in a parallel aligned condition into the packaging machine 19 where the product is wrapped and discharged at the station 23 for subsequent boxing.

The several operational steps mentioned above in general terms are also found in the logic flow chart of FIGS. 10 and 10a and are stated there in more detail in machine logic operational terms well understood in the field. The control over the various sensors, motors, hydraulic or pneumatic cylinders and associated control valves necessarily contemplated by the logic flow chart can be obtained in a control program which may include a micro-processor and the arrangement of such program is within the skill of the art.

It will be understood that their use of the subject rod aligning and transfer apparatus disclosed here is adapted for use with either a single transfer conveyor 21 or may serve two such conveyors arranged end-for-end. The two transfer conveyors can serve two packaging machines. Further, in certain applications, it is advantageous to deposit products directly from the canisters 42 into the pocket between adjacent flights on the transfer conveyor and to dispense with the timing hopper assemblies in the system. It will also be understood that the term "pocket" as used herein is meant to embrace both a timing hopper assembly apparatus and a pocket between two adjacent flights on the transfer conveyor.

While preferred embodiments of the invention have been described herein, it will thus be seen that the objects set forth above may be readily and efficiently obtained and certain changes may be made in the above-described construction without departing from the scope of the invention. It is intended that all matter contained in the description or shown in the accompanying drawings shall be interpreted as illustrative, and not in a limiting sense.

What is claimed is:

1. An apparatus for receiving rod-like elements from a combinational computerized weigher and for placing such elements in an aligned selected group for handling by a packaging machine, the combination comprising:
   receptacle means having an opening in the top portion thereof serving to receive therein a weighed batch of rod-like elements from the weigher, the receptacle means being configured to receive and maintain the rod-like elements in a generally vertical orientation;
   selective discharge means serving to support the rod-like elements in said receptacle means and for releasing such elements for movement therebelow in response to a discharge command;
   means associated with said apparatus defining a pocket for deposit of such rod-like elements;
   first and second canister means pivotally mounted in an array wherein each canister means may be rotated into a first position in vertical alignment with said receptacle means for receiving therein the rod-like elements released by the selective discharge means and then rotated into a second position to be in horizontal alignment with said pocket wherein the rod-like elements are deposited in a generally horizontal attitude en route to the packaging machine, power means for shifting said canister array in a sequence such that first one and then the other of said canister means occupies the vertical position and then the horizontal position;

said canister means including gate means serving to release in the horizontal position the rod-like elements from the canister means into said pocket in response to a signal; and program control means serving to synchronize the operation of said selective discharge means, the shifting of said first and second canister means and the actuation of said gate means thereof whereby the rod-like elements may be transferred from the weigher in a generally vertical orientation to said pocket in a horizontal attitude.

2. The apparatus of claim 1 wherein said canister means included sidewalls, a portion thereof being defined by a pair of clamshell doors serving as said gate mean, and linkage means coupled to said clamshell doors for opening and closing said doors, and power means for driving said linkage means for effecting the door opening and closing.

3. The apparatus of claim 1 wherein vibrator means are coupled to said receptacle means serving to urge the rod-like elements to settle in said receptacle.

4. The apparatus of claim 1 wherein said first and second canister means are configured in a generally "L" shaped array, and means for shifting said array alternately in the right and left hand directions for delivering the rod-like elements into a procession of pockets.

5. The apparatus of claim 1 wherein timing hopper means form said pocket and are arranged for receiving the rod-like elements in a horizontal attitude from said canister means.

6. The apparatus of claim 1 wherein said selective discharge means comprises a knife gate serving as the bottom of the receptacle means, and power means serving to actuate said gate.

* * * * *